United States Patent
Karp (10) Patent No.: US 9,378,322 B1
(45) Date of Patent: Jun. 28, 2016

(54) PREPARING LAYOUTS FOR SEMICONDUCTOR CIRCUITS

(71) Applicant: Xilinx, Inc., San Jose, CA (US)

(72) Inventor: James Karp, Saratoga, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 14/603,946

(22) Filed: Jan. 23, 2015

(51) Int. Cl.
*G06F 17/50* (2006.01)

(52) U.S. Cl.
CPC .................. *G06F 17/5072* (2013.01)

(58) Field of Classification Search
CPC ..... G06F 15/00; G06F 19/00; G06F 19/3406; G06F 19/3481; G06F 17/5068; G06F 9/3001; G06F 17/5081; G06F 17/5009; G06F 2217/12; G06F 17/5045; G06F 17/50; G06F 17/5077; G06F 2217/16; G06F 2217/84; G03F 1/70; G03F 7/70433; G03F 7/70633; G03F 1/44; G03F 1/36
USPC .................................................. 716/118–125
See application file for complete search history.

(56) References Cited

U.S. PATENT DOCUMENTS

| | | | |
|---|---|---|---|
| 8,490,030 B1 * | 7/2013 | Chiang .................... | G06F 17/50 716/51 |
| 2009/0228853 A1 * | 9/2009 | Hong .................. | G06F 17/5068 716/119 |
| 2013/0326435 A1 * | 12/2013 | Chiang ............... | G06F 17/5081 716/52 |

OTHER PUBLICATIONS

Amusan, Oluwole A. et al., "Charge Collection and Charge Sharing in a 130 nm CMOS Technology," *IEEE Transactions on Nuclear Science*, Dec. 2006, pp. 3253-3258, vol. 53, No. 6, IEEE, Piscataway, New Jersey, USA.

Lee, Hsiao-Heng Kelin et al., "LEAP: Layout Design through Error-Aware Transistor Positioning for Soft-Error Resilient Sequential Cell Design," *Proc. of the 2010 IEEE International Reliability Physics Symposium*, May 2, 2010, pp. 203-212, IEEE, Piscataway, New Jersey, USA.

* cited by examiner

*Primary Examiner* — Binh Tat
(74) *Attorney, Agent, or Firm* — LeRoy D. Maunu (57) ABSTRACT

According to a method of preparing a layout of semiconductor circuit elements, a computer processor determines a first value of a distance metric that describes a separation between at least one well of a first type and at least one well of a second type in a first layout of a circuit design represented in a memory coupled to the computer processor. The at least one well of the first type and the at least one well of the second type are rearranged into a second layout. The method determines a second value of the distance metric that describes separation between the at least one well of the first type and the at least one well of the second type in the second layout. The second layout is stored in response to the second value of the distance metric being greater than the first value of the distance metric.

15 Claims, 6 Drawing Sheets

PREPARING LAYOUTS FOR SEMICONDUCTOR CIRCUITS

TECHNICAL FIELD

The disclosure generally relates to preparing layouts for semiconductor circuits.

BACKGROUND

As semiconductor circuits have scaled to smaller sizes, susceptibility to single event upsets (SEUs) has become a greater concern. In one approach to the mitigation of SEUs, the layout of drain contact nodes is adjusted to provide resilience against SEUs. In the LEAP (Layout design through Error-Aware Transistor Positioning) approach, the response to a single event of each individual drain contact node in the layout of the circuit is analyzed. The drain contact nodes are placed in the layout such that the drain contact nodes act together to fully or partially cancel the effect of the single event.

The LEAP approach does not mitigate SEUs that are caused through parasitic bipolar action. Through parasitic bipolar action, a transistor formed over a well of a first type may turn on if a single event in an adjacent well of a different type induces sufficient current through a transistor in the adjacent well. One approach to protecting against parasitic bipolar action is to form guard rings between P wells and N wells. Another approach is to provide further separation of the nodes in the layout. Both approaches consume sizeable amounts of die space.

SUMMARY

According to a disclosed method of laying out semiconductor circuit elements, a computer processor determines a first value of a distance metric that describes a separation between at least one well of a first type and at least one well of a second type in a first layout of a circuit design represented in a memory coupled to the computer processor. The first and second types are complementary. The computer processor rearranges the at least one well of the first type and the at least one well of the second type into a second layout represented in the memory. The second layout is different from the first layout. A second value of the distance metric that describes separation between the at least one well of the first type and the least one well of the second type in the second layout is determined by the computer processor. The second layout is stored in the memory in response to the second value of the distance metric being greater than the first value of the distance metric.

A system for preparing a layout for semiconductor circuit elements is disclosed, and includes a memory arrangement and a computer processor coupled to the memory arrangement. The memory arrangement is configured with program instructions that when executed by the computer processor cause the computer processor to determine a first value of a distance metric that describes separation between at least one well of a first type and at least one well of a second type in a first layout of a circuit design represented in a memory coupled to the computer processor. The first and second types are complementary. The processor rearranges the at least one well of the first type and the at least one well of the second type into a second layout represented in the memory and different from the first layout. A second value of the distance metric that describes separation between the at least one well of the first type and the least one well of the second type in the second layout is determined by the processor, the second layout is stored in the memory in response to the second value of the distance metric being greater than the first value of the distance metric.

Other features will be recognized from consideration of the Detailed Description and Claims that follow.

BRIEF DESCRIPTION OF THE DRAWINGS

Various aspects and features of the method and system will become apparent upon review of the following detailed description and upon reference to the drawings, in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems offer improved SEU mitigation over the LEAP approach by mitigating SEUs that are caused through parasitic bipolar action. Unlike prior approaches that use guard rings or increased separation of nodes, the disclosed methods and systems enhance SEU immunity of semiconductor circuitry without increasing the footprint of the circuitry.

In accordance with the disclosed methods and systems, adjacent P wells and N wells are rearranged in order to increase the distance between the centers of adjacent wells of different types. In some instances, a symmetric layout of adjacent P and N wells may be made asymmetric. Wells may be moved in order to reduce the number of adjacencies and increase the distance between the centers of the different type wells. In other instances, adjacent P and N wells may be reshaped in order to increase the distance between the centers of the wells.

By increasing the distances between centers of adjacent different type wells, the overall separation between nodes in the wells may be increased. The sizes of the wells may be restricted when wells are moved and/or reshaped in order to avoid increasing the footprint of the circuitry. Moving or reshaping wells increases the distances between centers of wells, which effectively increases overall the distances between nodes in the wells. The techniques described herein may be applied to standard cells, such as flip-flops and 6-transistor and 12-transistor memory cells, as well as to non-standard cells.

Figure 1:
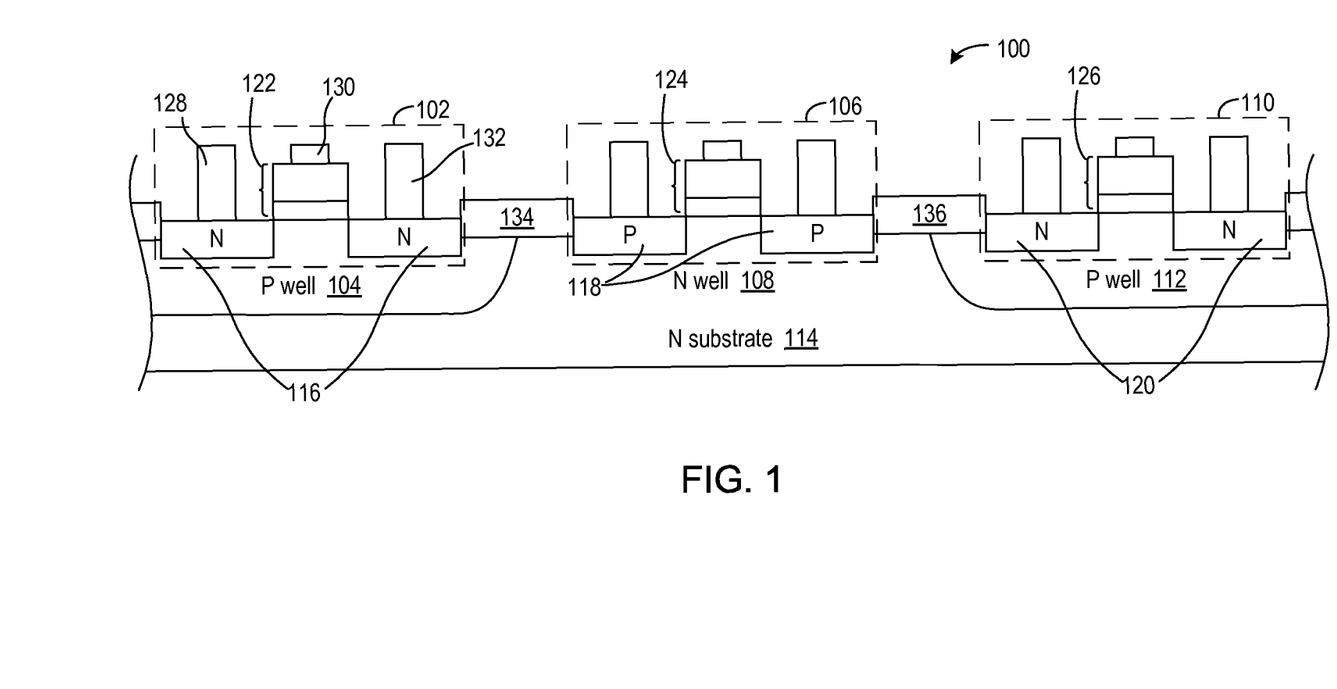
FIG. 1 shows a side view of an example of a layout of semiconductor circuit elements.

FIG. 1 shows a side view of an example of a layout 100 of semiconductor circuit elements. The layout is presented to illustrate an arrangement of different types of wells and circuit elements that may be constructed within those wells. By rearranging wells of different types, as shown in FIGS. 2-6, the distance between the centers of the wells is increased, thereby increasing the overall distance between the nodes of circuit elements in the different wells. Though the layout 100 depicts a specific arrangement of types of wells and circuit elements within the wells, it will be recognized that the techniques described in this disclosure are applicable to other arrangements of wells having other circuit elements.

The example layout includes three transistors in three wells. Transistor 102 is formed in P well 104, which is a P-type well, transistor 106 is formed in N well 108, which is an N-type well, and transistor 110 is formed in another P-type well 112. Each of the wells 104, 108, and 112 may include additional circuit elements and connections according to the implemented circuit. The wells are formed in an N-type substrate 114.

Each transistor includes respective source/drain regions. Transistor 102 includes source/drain regions 116, transistor 106 includes source/drain regions 118, and transistor 110 includes source/drain regions 120. Each transistor also includes a polysilicon gate structure. Transistor 102 includes gate structure 122, transistor 106 includes gate structure 124, and transistor 110 includes gate structure 126. Contacts are connected to the source/drain regions and to the gate structures of each of the transistors. For example, transistor 102 has contacts 128, 130, and 132. Transistors 102 and 110 are NMOS transistors, and transistor 106 is a PMOS transistor. Shallow trench isolation structures 134 and 136 separate the transistors.

Figure 2:
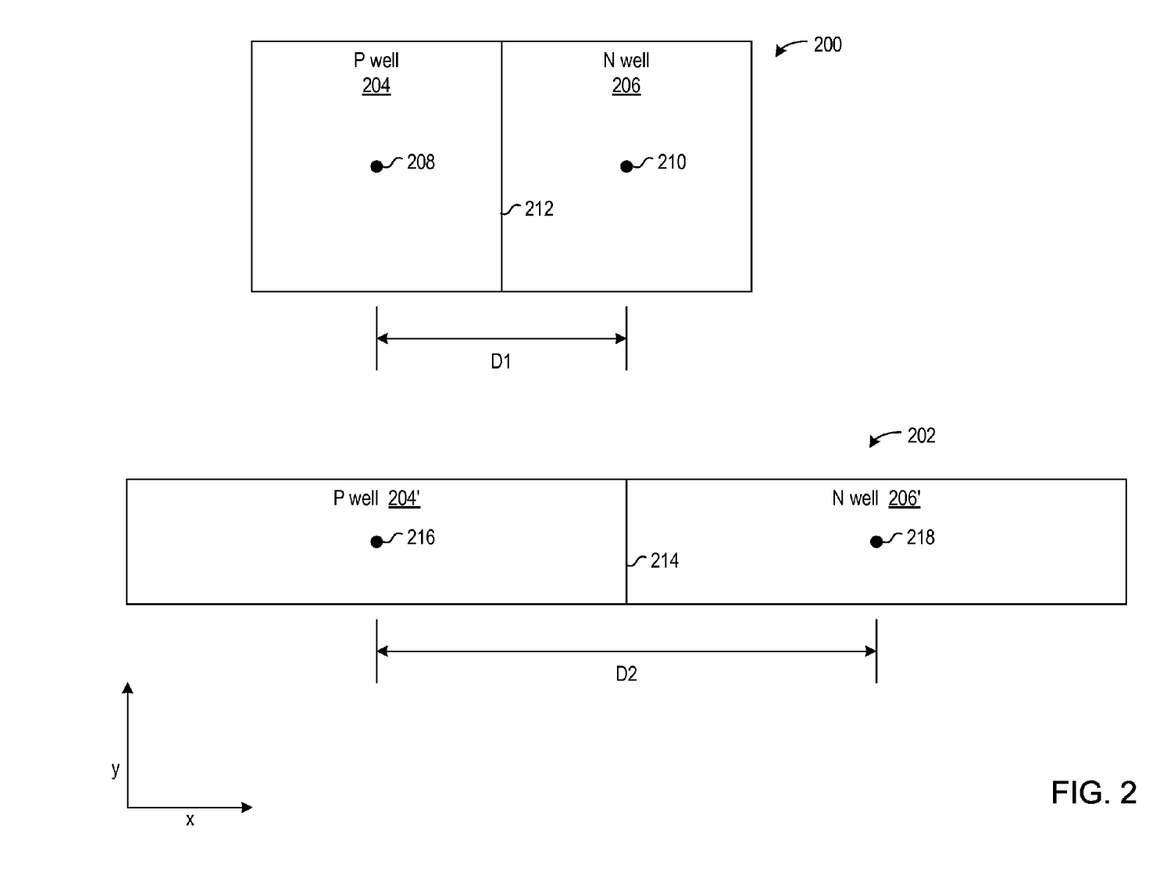
FIG. 2 shows a plan view of two different layouts of adjacent P and N wells.

FIG. 2 shows a plan view of two different layouts of adjacent P and N wells. The wells of layout 200 may be rearranged into layout 202 in order to increase the distance between the centers of the wells. The distance between the center 208 of P well 204 and the center 210 of N well 206 is shown as D1. N well 206 is adjacent to P well 204 in the x dimension of the layout.

The P well 204 and the N well 206 may be rearranged by changing the shape of the wells as shown by P well 204' and N well 206' in layout 202. The circuit elements (not shown) within P well 204' are the same as the circuit elements (not shown) of P well 204, and the circuit elements (not shown) within N well 206' are the same as the circuit elements (not shown) of N well 206.

P well 204 and N well 206 are reshaped such that the x dimensions of the wells are increased and the y dimensions are decreased. The abutting sides of the wells is shown as boundary 212 and is reduced in length as shown by boundary 214 in layout 202. The reshaping of the wells increases the distance between the centers of the wells. In layout 202, the distance D2 between the center 216 of P well 204' and the center 218 of N well 206' is greater than D1 in layout 200, while P well 204' is the same size as P well 204, and N well 206' is the same size as N well 206.

Figure 3:
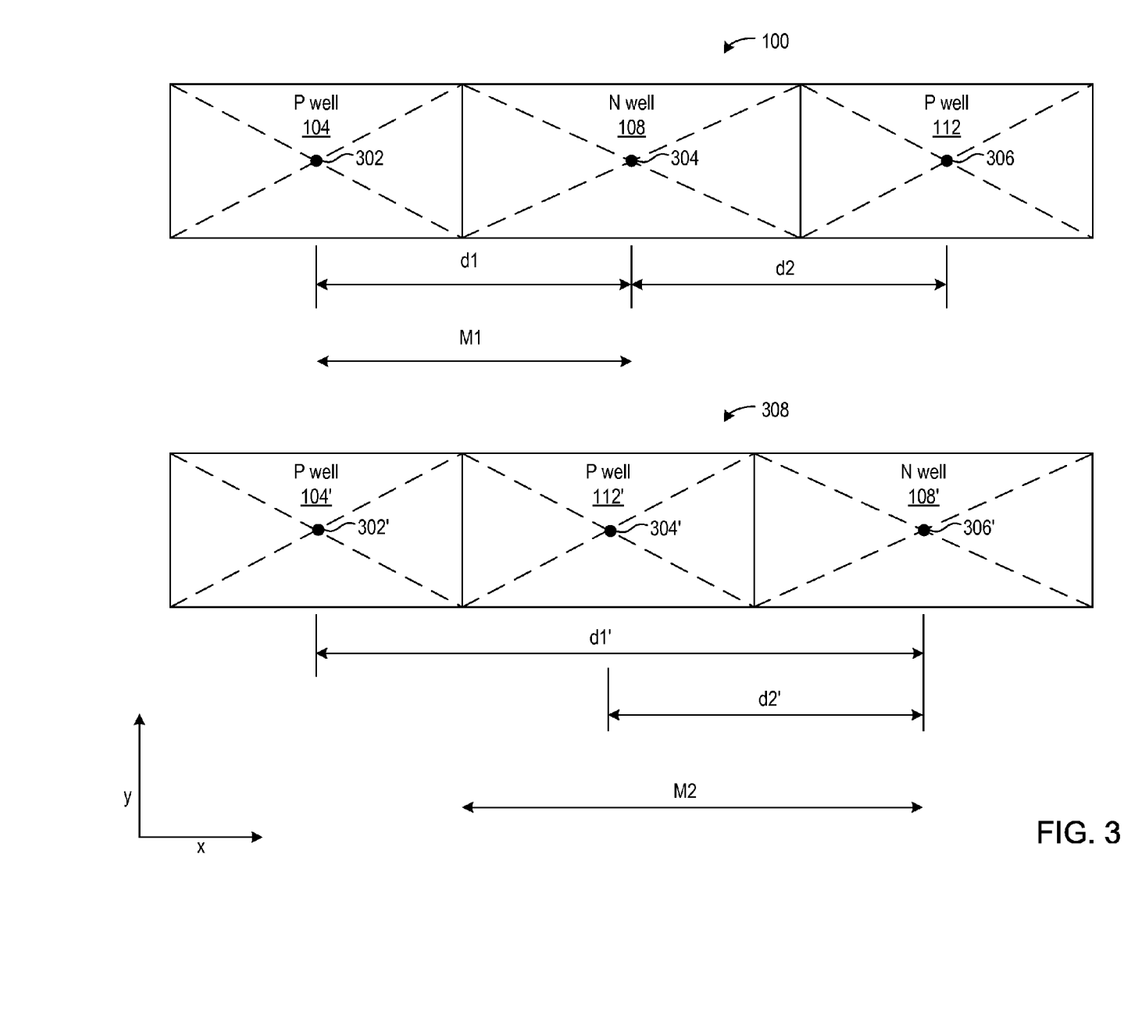
FIG. 3 is a plan view showing a rearrangement of the N well and P wells of the layout of FIG. 1.

FIG. 3 is a plan view showing a rearrangement of the N well and P wells of the layout of FIG. 1. The N well 108 is adjacent to the P well 104 in the x dimension of the layout, and the P well 112 is adjacent to the N well 108 in the x dimension of the layout. In the example of FIG. 3, the rearranging includes moving the wells in order to increase the separation between the centers of the wells.

In the initial layout 100, wells 104, 108, and 112 have centers 302, 304, and 306, respectively, the distance between the center 302 of P well 104 and the center 304 of N well 108 is shown as d1, and the distance between the center 306 of P well 112 and the center 304 of N well 108 is shown as d2. In an example implementation, the overall distance between the centers 302 and 306 of the P wells 104 and 112 and the center 304 of the N well 108 is the average of the distances and is shown as M1. That is, M1=(d1+d2)/2. For a rectangular well, the center of the well may be determined by finding the midpoint of a diagonal of the rectangle. In the example, the midpoint is shown as the intersection of the two diagonals in a rectangular well. If the Cartesian coordinates of the endpoints of the diagonal are known (e.g., $(x_1, y_1)$ and $(x_2, y_2)$), then the midpoint of the diagonal would be at $((x_2-x_1)/2, (y_2-y_1)/2)$.

Layout 308 shows a rearrangement of the wells from layout 100. P well 104', N well 108', and P well 112' in layout 308 correspond to P well 104, N well 108, and P well 112 in layout 100, respectively. Instead of N well 108 being centered between P wells 104 and 112 as in layout 100, layout 308 has P wells 104' and 112' adjacent to one another, and N well 108' adjacent only to P well 112'. Rearranging the wells as shown in the layout 308 increases the distance between the center 302' of P well 104' and the center 306' of N well 108' relative to the layout 100. Distance d1' in layout 308 is greater than d1 in layout 100. Distance d2' (from center 304' to center 306') in layout 308 is equal to d2 in layout 100. Notably, the average distance M2 between the N well 108' and P wells 104' and 112' is greater than the average distance M1 in layout 100, and the area occupied by the layout 308 is no greater than the layout 100. The greater distance between the N well and P wells mitigates parasitic bipolar charge sharing between the N well and P wells.

Though P wells 104' and 112' are shown as separate wells, for some layouts it may be feasible to combine the wells into a single P well.

Figure 4:
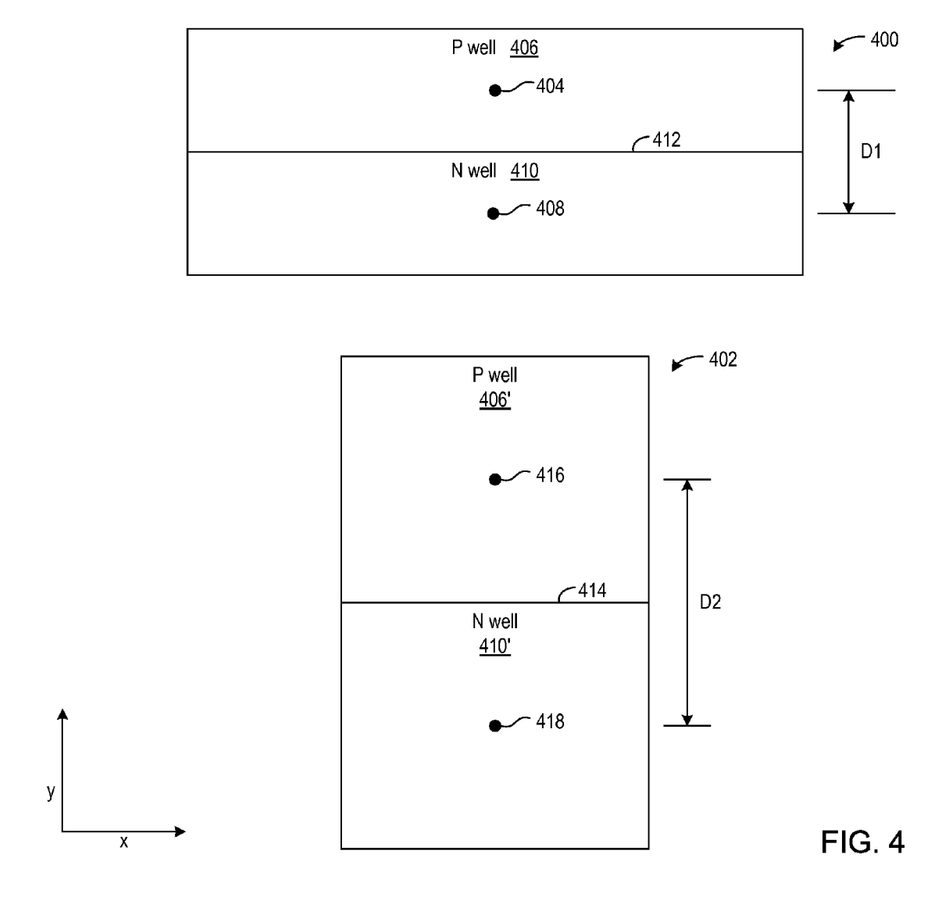
FIG. 4 shows a plan view of two different layouts of adjacent P and N wells.

FIG. 4 shows a plan view of two different layouts of adjacent P and N wells. The wells of layout 400 may be rearranged into layout 402 in order to increase the distance between the centers of the wells. The distance between the center 404 of P well 406 and the center 408 of N well 410 is shown as D1.

The P well 406 and the N well 410 may be rearranged by changing the shape of the wells as shown by P well 406' and N well 410' in layout 402. The circuit elements (not shown) within P well 406' are the same as the circuit elements (not shown) of P well 406, and the circuit elements (not shown) within N well 410' are the same as the circuit elements (not shown) of N well 410.

P well 406 and N well 410 are reshaped such that the x dimension of the wells is decreased and the y dimension is increased. The boundary 412 between the wells is reduced in length as shown by boundary 414 in layout 402. The reshaping of the wells increases the distance between the centers of the wells. In layout 402, the distance D2 between the center 416 of P well 406' and the center 418 of N well 410' is greater than D1 in layout 400, while P well 406' is the same size as P well 406, and N well 410' is the same size as N well 410.

Figure 5:
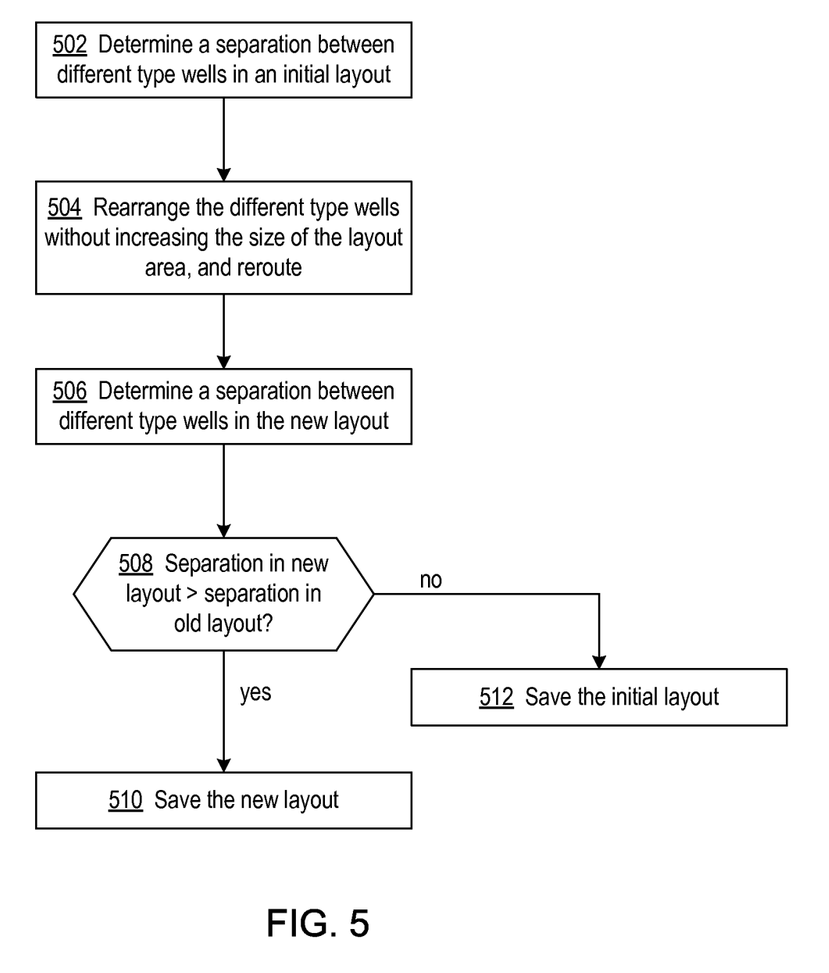
FIG. 5 is a flowchart of a process for preparing a layout of adjacent and different types of wells of a semiconductor circuit arrangement.

FIG. 5 is a flowchart of a process showing operations for preparing a layout of adjacent and different types of wells of a semiconductor circuit arrangement. The process commences with an initial layout, and at block 502 determines the value of a distance metric that describes the separation between adjacent wells of complementary types in the initial layout. In one implementation, the distance metric may be the distance between respective centers of adjacent wells of different types, with the centers of the wells determined as described above. In another implementation, the distance metric may be the average of distances between centers of adjacent wells of different types. For a rectangular well, the center of the well may be determined by finding the midpoint of a diagonal of the well.

The initial and new layouts may be represented as data structures in a memory of a computer system, and the processing may be performed by one or more processors particularly programmed with instructions to carry out the rearranging of the layouts. The process may be iterative such that each iteration evaluates an alternative rearrangement of the wells, and the layout having the greatest value of the distance metric may be stored as the desired layout. The process may be performed separately for individual portions of a layout.

At block 504, the wells are rearranged into a different layout without increasing the size of the wells. The rearranging may entail moving, combining, and/or reshaping the wells while maintaining the function of the implemented circuit. The size of each well in the new layout may be restricted to the size of the well in the initial layout, or the overall size of the new layout may be restricted to the overall size of the initial layout.

Another value of the distance metric is determined at block 506 for the new layout. The distance metric describes separation between adjacent wells of different types in the new layout. At decision block 508, the process determines whether the separation (distance value) computed for the new layout is greater than the separation (distance value) computed for the initial layout. In response to the separation computed for the new layout being greater than the separation computed for the initial layout, the new layout is stored at block 510. In response to the separation computed for the new layout not being greater than the separation computed for the initial layout, the initial layout is stored at block 512.

Figure 6:
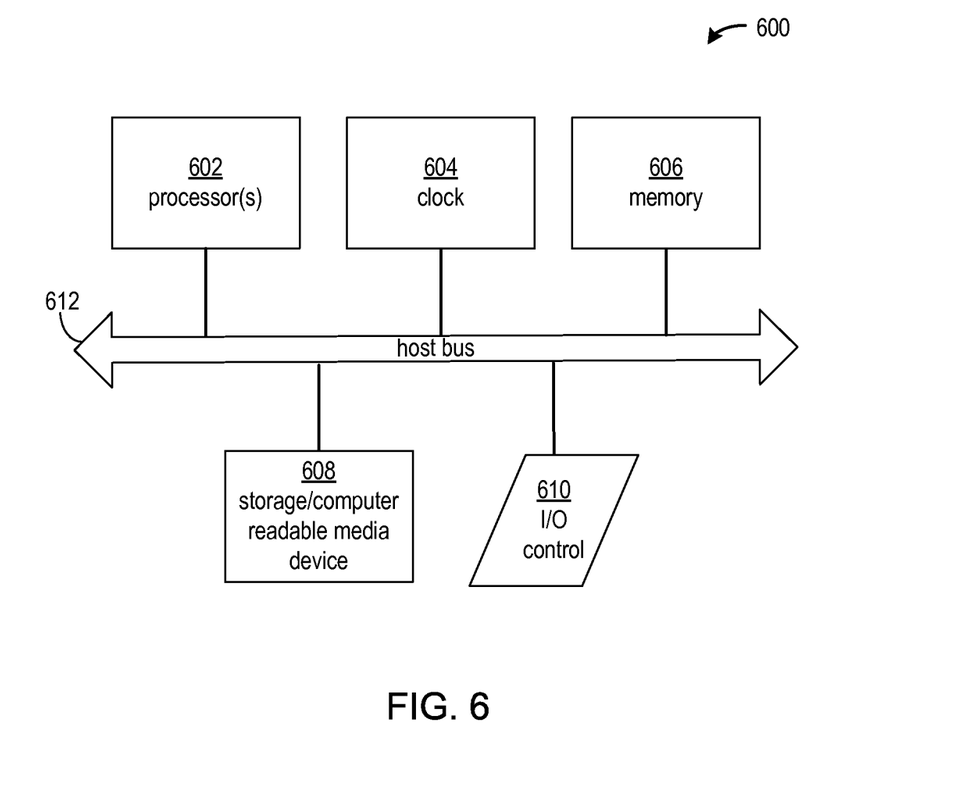
FIG. 6 shows a block diagram of an example computing arrangement that may be configured to implement the data structures and processes described herein.

FIG. 6 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory arrangement 606, a storage arrangement 608, and an input/output control unit 610, all coupled to a host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory, and a main memory. The storage arrangement 608 may include local and/or remote persistent storage, such as provided by magnetic disks (not shown), flash, EPROM, or other non-volatile data storage. The storage unit may be read or read/write capable. Further, the memory arrangement 606 and storage arrangement 608 may be combined in a single arrangement.

The processor(s) 602 executes the software in storage arrangement 608 and/or memory arrangement 606, reads data from and stores data to the storage arrangement 608 and/or memory arrangement 606, and communicates with external devices through the input/output control arrangement 610. These functions are synchronized by the clock signal generator 604. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for preparing layouts of semiconductor circuits. Other aspects and features will be apparent to those skilled in the art from consideration of the specification. It is intended that the specification and drawings be considered as examples only, with a true scope of the invention being indicated by the following claims.

What is claimed is:

1. A method of preparing a layout for semiconductor circuit elements, comprising:

determining, by a computer processor, a first value of a distance metric that describes separation between at least one well of a first type and at least one well of a second type in a first layout of a semiconductor circuit represented in a memory coupled to the computer processor, wherein the first and second types are complementary;

rearranging, by the computer processor, the at least one well of the first type and the at least one well of the second type and preparing a second layout of the semiconductor circuit represented in the memory and different from the first layout;

restricting the second layout to an area having a size equal to a size of an area of the first layout;

determining, by the computer processor, a second value of the distance metric that describes separation between the at least one well of the first type and the at least one well of the second type in the second layout;

determining respective centers of the at least one well of the first type and the at least one well of the second type in the first and second layouts;

wherein the determining the first and second values of the distance metric includes determining distances between centers of the at least one well of the first type and the at least one well of the second type in the first and second layouts; and storing the second layout in the memory in response to the second value of the distance metric being greater than the first value of the distance metric.

2. The method of claim 1, wherein:

the at least one well of the first type includes a first well and a second well, and the at least one well of the second type includes a third well; and in response to the third well being adjacent to the first well in an x dimension of the first layout, and the second well being adjacent to the third well in the x dimension of the first layout, the rearranging includes arranging the second well adjacent to the first well in an x dimension in the second layout, and arranging the third well adjacent to the second well in the x dimension in the second layout.

3. The method of claim 1, wherein:
the at least one well of the first type includes a first well and a second well, and the at least one well of the second type includes a third well; and
in response to the third well being adjacent to the first well in an x dimension of the first layout, and the second well being adjacent to the third well in the x dimension of the first layout, the rearranging includes combining the first well and the second well into one well.

4. The method of claim 1, wherein:
the at least one well of the first type includes a first well, and the at least one well of the second type includes a second well; and
in response to the first well being adjacent to the second well in an x dimension of the first layout, and a y dimension of abutting sides of the first and second wells being greater than an x dimension of the first and second wells, the rearranging includes reshaping the first well and the second well;
wherein in the second layout the first well is adjacent to the second well in an x dimension of the second layout, and the y dimension of the abutting sides of the first and second wells in the second layout is less than the x dimension of the first and second wells in the first layout.

5. The method of claim 1, wherein:
the at least one well of the first type and the at least one well of the second type are rectangular; and
the determining the respective centers includes, for each well of the at least one well of the first type and the at least one well of the second type, determining a midpoint of a diagonal of the well.

6. The method of claim 1, wherein the determining the first and second values of the distance metric includes determining an average of distances between centers of the first and third wells and centers of the second and third wells.

7. The method of claim 1, wherein the first type is P-type and the second type is N-type.

8. The method of claim 1, wherein the first type is N-type and the second type is P-type.

9. A system for preparing a layout for semiconductor circuit elements, comprising:
a memory arrangement; and
a computer processor coupled to the memory arrangement;
wherein the memory arrangement is configured with program instructions that when executed by the computer processor cause the computer processor to perform operations including:
determining a first value of a distance metric that describes separation between at least one well of a first type and at least one well of a second type in a first layout of a semiconductor circuit represented in a memory coupled to the computer processor, wherein the first and second types are complementary;
rearranging the at least one well of the first type and the at least one well of the second type and preparing a second layout of the semiconductor circuit represented in the memory and different from the first layout;
restricting the second layout to an area having a size equal to a size of an area of the first layout;
determining a second value of the distance metric that describes separation between the at least one well of the first type and the least one well of the second type in the second layout;
determining respective centers of the at least one well of the first type and the at least one well of the second type in the first and second layouts;
wherein the determining the first and second values of the distance metric includes determining distances between centers of the at least one well of the first type and the at least one well of the second type in the first and second layouts; and
storing the second layout in the memory in response to the second value of the distance metric being greater than the first value of the distance metric.

10. The system of claim 9, wherein:
the at least one well of the first type includes a first well and a second well, and the at least one well of the second type includes a third well; and
in response to the third well being adjacent to the first well in an x dimension of the first layout, and the second well being adjacent to the third well in the x dimension of the first layout, the rearranging includes arranging the second well adjacent to the first well in an x dimension in the second layout and arranging the third well adjacent to the second well in the x dimension in the second layout.

11. The system of claim 9, wherein:
the at least one well of the first type includes a first well and a second well, and the at least one well of the second type includes a third well; and
in response to the third well being adjacent to the first well in an x dimension of the first layout, and the second well being adjacent to the third well in the x dimension of the first layout, the rearranging includes combining the first well and the second well into one well.

12. The system of claim 9, wherein:
the at least one well of the first type includes a first well, and the at least one well of the second type includes a second well; and
in response to the first well being adjacent to the second well in an x dimension of the first layout, and a y dimension of abutting sides of the first and second wells being greater than an x dimension of the first and second wells, the rearranging includes reshaping the first well and the second well;
wherein in the second layout the first well is adjacent to the second well in an x dimension of the second layout, and the y dimension of abutting sides of the first and second wells in the second layout is less than the x dimension of the first and second wells in the first layout.

13. The system of claim 9, wherein the memory is further configured with instructions that when executed by the computer processor cause the computer processor to:
determine respective centers of the at least one well of the first type and the at least one well of the second type.

14. The system of claim 13, wherein:
the at least one well of the first type and the at least one well of the second type are rectangular; and
the determining the respective centers includes, for each well of the at least one well of the first type and the at least one well of the second type, determining a midpoint of a diagonal of the well.

15. The system of claim 9, wherein the determining the first and second values of the distance metric includes determining an average of distances between centers of the first and third wells and centers of the second and third wells.

* * * * *